United States Patent [19]

Uraneck et al.

[11] 3,928,498

[45] Dec. 23, 1975

[54] PREFORMED POLYMER LATEX IN EMULSION POLYMERIZATION SYSTEMS

[75] Inventors: Carl A. Uraneck; John E. Burleigh, both of Bartlesville, Okla.

[73] Assignee: Phillips Petroleum Company, Bartlesville, Okla.

[22] Filed: July 5, 1973

[21] Appl. No.: 376,582

[52] U.S. Cl............ 260/880 R; 260/82.7; 260/84.3; 260/85.5 P; 260/93.5 W; 260/94.4; 260/879; 260/881; 260/884; 260/885; 260/886

[51] Int. Cl.² .... C08F 2/22; C08F 2/26; C08F 2/30; C08F 2/42

[58] Field of Search .......... 260/84.3, 85.5 P, 880 R, 260/879 R, 82.7, 881, 884, 885, 886

[56] References Cited

UNITED STATES PATENTS

| | | | |
|---|---|---|---|
| 2,523,596 | 9/1950 | Schulze et al. | 260/84.3 |
| 3,267,061 | 8/1966 | Senior et al. | 260/880 R |
| 3,742,092 | 6/1973 | Duke et al. | 260/880 R |

*Primary Examiner*—Edward J. Smith

[57] ABSTRACT

Initial depletion of organosulfur molecular weight regulator during initial polymerization conversion in emulsion polymerization systems employing coagitated mixtures of emulsifiers and organosulfur molecular weight modifiers is reduced by adding preformed polymer latex as a part of a coagitated mixture of emulsifier and modifier, or to the emulsion system directly.

23 Claims, No Drawings

3,928,498

PREFORMED POLYMER LATEX IN EMULSION POLYMERIZATION SYSTEMS

FIELD OF THE INVENTION

The invention relates to emulsion polymerization systems employing organosulfur compounds as molecular weight regulators or modifiers.

BACKGROUND OF THE INVENTION

Organosulfur compounds employed as molecular weight modifiers or regulators in emulsion polymerization systems have exhibited somewhat variable efficiencies. Higher molecular weight species, particularly of the mercaptan compounds, possess relatively low chain transfer effectiveness. Lower molecular weight species have higher volatilities which may contribute to residual odors in the polymers. Coagitating mixtures of the emulsifiers and organosulfur compounds prior to employment in the emulsion system have improved the effective reactivity of the modifiers.

Organosulfur compounds have exhibited undesirable rates of loss, i.e., depletion, during the very first stages of monomer conversion in the emulsion polymerization system. Maximum potential effectiveness of the modifier has not been achieved, necessitating use of undesirable amounts, or at least more than would be necessary, adding to the cost of the polymer, and resulting in variations in product quality. It is certainly preferable for both economy and product quality with minimum residual odor to use minimum amounts of modifier consistent with effectiveness.

OBJECTS OF THE INVENTION

It is an object of the invention to improve the effectiveness of organosulfur compounds as molecular weight modifiers in emulsion polymerization systems.

Other aspects, objects, and advantages of the invention will become apparent from the study of this disclosure including the appended claims.

BRIEF SUMMARY OF THE INVENTION

A small amount of preformed polymer latex is included in the emulsion polymerization system employing a coagitated mixture of aqueous emulsifier and organosulfur molecular weight modifier. The small amount of preformed polymer latex avoids untoward early depletion of the modifier.

The emulsion polymerization system employs a coagitated mixture of aqueous emulsifier and organosulfur molecular weight modifier. The polymer latex can be added according to our invention either (1) to the emulsifier and modifier admixture prior to coagitation thereof and all coagitated; or, (2) the polymer latex can be added to a coagitated mixture of emulsifier and modifier with or without further coagitation; or (3) the polymer latex can be added to the polymerization zone coincident with, or before addition of the coagitated mixture, or after addition of the coagitated mixture, to the emulsion polymerization zone, but prior to initiation. The desired total amount of the preformed polymer latex can be added by any one or divided in part between any two or more of these modes of addition.

DETAILED DESCRIPTION OF THE INVENTION

Our invention applies to emulsion polymerization processes in which the control or modification of polymer molecular weight is effected by means of a chain transfer mechanism employing organosulfur compounds as chain transfer agents or molecular weight regulators or modifiers.

Preformed Polymer Latex

The preformed polymer latex suitable for use in accordance with our invention includes any of the latexes such as polybutadiene or butadienestyrene latexes prepared in emulsion systems employing emulsifiers such as the rosin or fatty acid soap emulsifiers, exemplary being from the recipes known commercially as SBR-1000, SBR-1500, SBR-1502, SBR-1503, and the like. Any of the polymerizable conjugated dienes, polymerizable monovinyl-substituted aromatic compounds, various other ethylenically unsaturated monomers can be employed, all as are known for emulsion polymerization systems. The polymer content of the latex can represent a homopolymer, copolymer, mixture of homopolymers or copolymers, as may be convenient.

The particular polymer in the latex may be but does not necessarily need to be the same or even closely related to the particular polymer ultimately to be prepared in the particular emulsion polymerization system. However, if the polymerization system contains a cationic emulsifier, it is preferable that any surface active agent in the preformed latex also be cationic or, correspondingly, that they both be anionic. If a nonionic emulsifying system is being employed in the polymerization mixture, no such preference exists.

The solids content of useful latexes can be varied within wide limits with no particular specifically required limits. In practice, commercially available latexes suitable for use range in solids content from about 20 to 75 weight percent, though the practice of this invention need not be limited to this range. The quantity of latex employed can be expressed in terms of the weight of the polymer content of the latex per hundred parts by weight of total monomer to be emulsion polymerized. On this basis, the quantity of polymer latex employed is not critical, and exemplarily can range from about 0.1 to 10, preferably 0.5 to 5, parts by weight of polymer per 100 parts by weight of monomer.

Coagitation of Emulsifier and Modifier

The aqueous emulsifier solution and organosulfur compound are admixed and coagitated prior to their introduction into the balance of the polymerization mixture. This coagitation markedly increases the modifying activity of the organosulfur compounds. The effect of agitation is particularly advantageous in cases where the value of the regulating index is less than about 4 in SBR-type systems under conditions of a standard commercial polymerization rate for SBR-type systems. Cf. Uraneck, C. A., and Burleigh, J. E., 19 *Kautschuk and Gammi Kungtstoffe*, 532–542 (1961). Of course, coagitation would not be employed to the extent of exceeding the optimum regulating index value excessively, because to the degree that such occurred, it would tend to negate the value of coagitation.

The increase in reactivity of a modifier can be interpreted quantitatively as an increase in the regulating index as measured by the rate if depletion of the modifier. Specifically, the regulating index, $r$, is defined as $$r = -\frac{d(\ln S)}{dX}$$

wherein S represents the concentration of organosulfur compound and X the fractional conversion. Coagitation of the mixture of modifier and emulsifier affords a range of r values within limits based on the reactivity of the organosulfur compound and the intensity and duration of agitation.

A rate of mercaptan depletion that would be considered normal would be represented by a straight line, or nearly so, for an appreciable portion of the polymerization when r is plotted as the log of residual mercaptan versus conversion of monomer. However, it has been found that with coagitated emulsifier solution-mercaptan systems, that the depletion rate for the mercaptan modifier tends to be abnormally high during the first few percent of monomer conversion, particularly the first approximately 10 percent of the polymerization reaction. This abnormally high rate of mercaptan depletion, whatever its cause, subtracts from the quantity of mercaptan available for polymer modification. This effect tends to be an uncontrolled variable. Smooth, efficient proper operation of an emulsion polymerization system requires that this tendency toward abnormal depletion be reduced or effectively eliminated.

Coagitation is the strong and thorough mixing of the organosulfur compound modifier or regulator with at least a portion of the emulsifier, preferably as an aqueous emulsifier, i.e., emulsifier-water solution, in such manner as to afford significant reduction in the particle size of the organosulfur compound. The amount or degree of mixing is that which is sufficient to effectuate the extent of improvement in regulating index desired. Coagitation of modifier and emulsifier is distinguished from the ordinary preemulsification mixing which may be conducted as the polymerization mixture is tumbled or otherwise agitated when being brought to the desired polymerization temperatures. If redox couple is being used, the reductant is not added until reaction temperature is reached. If single initiator, e.g., a peroxide, is being used, it is not added until reaction temperature is reached. Coagitation takes place prior to the preemulsification step.

Coagitation of modifier and emulsifier may be accomplished by any suitable means including tumbling action, stirring, shearing action, application of high frequency vibrations, or the like. Coagitation should be performed under an inert atmosphere, such as nitrogen, helium and the like, to avoid loss of organosulfur compound. The time employed should be at least sufficient to provide the desired increase in modifier activity and depends on the efficiency of the equipment used and the particular components and modifiers employed. The frequency and force of collision and the wave frequency, intensity, and absorbing capacity of the ultrasonic milled components all may vary with the time employed. More vigorous operations effect desired results in reduced time, e.g., effective agitation can occur with tumbling in about 70 to 100 hours, with ultrasonic vibration in 1 to 2 hours, and with high speed shearing action in less than one hour.

Modifiers

Our invention is applicable to any organosulfur molecular weight modifier or regulator employed in an emulsion polymerization system. Suitable types of organosulfur modifiers include the presently preferred mercaptans, as well as such as dialkyl dixanthogens, diaryl disulfides, tetraalkylthiuram mono- and disulfides, mercaptothiazoles, and the like, alone or in admixture.

Most used commercially at present are the mercaptan compounds, and of these presently are preferred hydrocarbyl mercaptans containing 8 to 20 carbon atoms per molecule including straight and branched chain alkyl, alkenyl, alkadienyl, as well as cycloalkyl, cycloalkenyl, cycloalkadienyl, and also aryl, and combinations such as alkaryl and aralkyl, and the like. The presently more preferred mercaptan modifiers are those of tertiary alkyl configuration.

The amount of organosulfur modifier employed can vary widely depending on the particular compound or mixture chosen, the polymerization temperatures, the emulsifier and other recipe ingredients, and the extent of modification desired. Coagitation permits the option of employing higher molecular weight organosulfur compound that might otherwise be employed in view of the capability of coagitation of modifier with emulsifier to raise regulating index. Satisfactory modification can be obtained by employing on the order of 0.01 to 5 phm parts organosulfur compound per 100 parts monomer by weight, with 0.05 to 2 phm presently being preferred, though greater or lesser amounts may be utilized where desired.

Suitable organosulfur compounds include n-octyl mercaptan, n-dodecyl mercaptan, t-nonyl mercaptan, t-dodecyl mercaptan, t-hexadecyl mercaptan, t-octadecyl mercaptan, t-eicosyl mercaptan, sec-octyl mercaptan, sec-tridecyl mercaptan, cyclododecyl mercaptan, cyclododecadienyl mercaptan; aryl mercaptans such as 1-naphthalenethiol; bis(tetrahydrofurfuran xanthogen), diphenyl disulfide, tetramethyl thiuram disulfide, 2-mercaptobenzothiazole; and the like. Mixtures or blends of any of these organosulfur compounds also can be used. Commercially available organosulfur compound modifiers are mixtures of organosulfur compounds, e.g., mixtures of such as t-dodecyl, t-tetradecyl, and t-hexadecyl mercaptans.

Emulsifying Agents

A wide variety of emulsifying agents can be employed, including rosin acid soaps, disproportionated rosin acid soaps, fatty acid soaps, mixtures of disproportionated rosin acid soaps with fatty acid soaps, alkaryl sulfonates, and other surface active materials and mixtures thereof. Nonionic emulsifiers also can be employed including polyethers and polyols.

Amounts of emulsifying agent employed depend on the agent type as well as on reaction parameters and polymerizable monomer concentration to be maintained in the emulsion polymerization system. An expedient range would be about 0.5 to 10 phm, parts by weight per 100 parts of monomer. The relative amounts of emulsifier:modifier can range widely depending on monomers, species, reaction parameters, degree of modification desired, and the like. An expedient range would be about 250:1 to 1:1 weight ratio of emulsifier:modifier, though operability outside of this range is feasible.

Aqueous medium normally is employed with the emulsifier, though other components such as one or more of the lower alcohols or glycols may be added for lower temperature polymerizations when desired. The amount of water or water and alcohol or glycol employed is a matter of convenience as to amounts of materials to handle and is not limiting as far as making the agitated admixture of emulsifier:modifier is concerned. Supplemental water for the emulsion polymerization process itself can be readily later added at that stage.

Initiators

Free-radical initiators useful in the emulsion polymerization process include any of the broad groups of compounds utilized for the purpose in emulsion polymerization systems, including redox initiator systems such as ferrous sulfate/hydrogen peroxide, potassium persulfate/sodium bisulfite, and the like, and more particularly the free-radical initiators classed as the monomer-soluble organoperoxides, organohydroperoxides and azo compounds. Amounts expediently employed are of the order of about 0.01 to 5 phm, more preferred about 0.03 to 1 phm.

Exemplary initiators include di-t-butyl peroxide, benzoyl peroxide, lauroyl peroxide, t-butyl peracetate, t-butyl perbenzoate, dicumyl peroxide, 2,5-dimethyl-2,5-di(t-butylperoxy)hexane, t-butyl hydroperoxide, cumene hydroperoxide, p-menthane hydroperoxide, cyclopentane hydroperoxide, diisopropylbenzene hydroperoxide, p-t-butylcumene hydroperoxide, pinene hydroperoxide, 2,2'-azobis(2-methylpropionitrile), and the like, and mixtures thereof.

Monomers

Monomers employed in the process of our invention include monomers polymerizable with a redox system or with free-radical initiators in emulsion polymerization processes, such as polymerizable conjugated dienes, alone or with monovinyl aromatic compound, or with other ethylenically unsaturated polymerizable monomers. Polymerizable conjugated dienes commonly employed include those containing 4 to 12, preferably for commercial availability and reactivity 4 to 8, carbon atoms per molecule, such as 1,3-butadiene, isoprene, chloroprene, piperylene, 2-methyl-1,3-pentadiene, 2,3-dimethyl-1,3-butadiene, 1,3-octadiene, 5,6-diethyl-1,3-octadiene, and the like. The conjugated dienes can be polymerized to form homopolymers or copolymers of two or more.

Polymers of conjugated dienes include copolymers formed by polymerizing one or more polymerizable conjugated dienes with one or more copolymerizable monomers, particularly the monovinyl-substituted or propenyl-substituted aromatic compounds, such as those of 8 to 20, more particularly for commercial availability and reactivity 8 to 12, carbon atoms per molecule, including styrene, various of the alkylstyrenes such as p-methylstyrene, 1-propenylbenzene or beta-methylstyrene, halostyrenes such as 2,3-dichlorostyrene; as well as other copolymerizable ethylenically unsaturated monomers including the nitriles such as acrylonitrile or methacrylonitrile, esters of acrylic and methacrylic acid, e.g., ethyl acrylate and methyl methacrylate, vinyl esters such as vinyl acetate, other vinyl compounds such as the vinyl halides exemplified by vinyl chloride; and the like.

The process of our invention also is useful in the preparation of SAN type resins, i.e., copolymers of styrene or substituted styrenes with the vinyl nitriles. Substituted styrenes include those of 8 to 20 carbon atoms per molecule such as alpha-methylstyrene, ortho-, meta-, or p-alkyl aromatic substituted styrenes; o-, m-, or p-halogenated styrenes wherein the halogen can be any of fluorine, chlorine, bromine, or iodine; and the vinyl nitriles include those of 3 to 12 carbon atoms per molecule such as acrylonitrile, methacrylonitrile, and the like, all as prepared in emulsion systems modified with organosulfur molecular weight modifiers. The coagitated modifiers are useful in preparing copolymers of styrene and acrylate including any of the esters of acrylic and methacrylic acid such as methyl, ethyl, butyl, acrylates and methacrylates. Latexes of these latter copolymers are particularly suitable for latex base paints.

A further class of polymers made in emulsion systems which can benefit from the process of our invention are the ABS compositions made by the emulsion process. In the ABS process, an emulsion or latex of an unsaturated elastomer is first prepared such as by dissolving the elastomer in polymerizable monomers and emulsifying the resulting solution, and the polymerizable monomer or various combinations of monomers such as the styrenes, vinylnitriles, acrylates, then are co- or terpolymerized in the presence of the elastomeric dispersion.

Polymerization Conditions

Polymerization conditions of temperature, time, pressure, and the like can range widely, depending upon particular materials and reactor conditions desired or convenient to employ, the monomers involved, relative volatility thereof, amounts of water, and equipment involved.

Polymerization commonly is carried out by continuously agitating the polymerization emulsion under an inert atmosphere, e.g., nitrogen, at polymerization temperatures expediently in the range of about $-40°$ to $+100°$ C., preferably about $0°$ to $50°$ C. The pH range can vary widely such as about 1 to 12, presently preferably about 7 to 10.8.

After the degree or extent of polymerization desired has been accomplished, the polymerization reaction can be terminated with a shortstop. An antioxidant usually is added to protect the polymer. The emulsion process results in a latex from which the polymer can be recovered by a process known as creaming, i.e., the addition of an aqueous salt solution such as sodium chloride solution, and coagulation of the polymeric product by the addition of a dilute mineral acid such as sulfuric acid. The polymeric product then is collected by filtration, washed, dried in conventional drying equipment.

Examples

Examples following are intended to further illustrate the invention. Particular species employed, conditions, amounts, are intended to be illustrative and not limitative of the reasonable and proper scope of our invention.

In the working examples given below, it was not necessary to "work-up" the product mixture after polymerization, i.e., it was not necessary to isolate the rubber produced since the parameter of interest was followed by periodic analyses of the reaction mixture.

Example I

Run 1 is a control run in that a preformed latex was not employed. The mixture that was coagitated consisted of the water, soap, and dithionite portions of the emulsifier solution plus the modifier, t-hexadecyl mercaptan. The coagitation was carried out under a nitrogen atmosphere in a Waring Blendor Model EP-1 for 40 minutes at 75° F. initial temperature to 200° F. final temperature. Then the other components of the Emulsifier Solution were added to the coagitated mixture and the polymerization for Run 1 was carried out under a nitrogen atmosphere, in accordance with the following recipe:

Recipe: SBR-1503

|  | Parts by Weight |
|---|---|
| Emulsifier Solution | |
| potassium fatty acid soap | 4.6 |
| KOH | 0.03 |
| KCl | 0.3 |
| sodium alkylnaphthalene sulfonate | 0.2 |
| $Na_2S_2O_4$ | 0.106 |
| water | 170 |
| Modifier | |
| t-hexadecyl mercaptan | 0.556 |
| Monomers | |
| butadiene | 70 |
| styrene | 30 |
| Oxidant | |
| p-Menthane hydroperoxide | 0.063 |
| Activator Solution | |
| tetrahydrate of the tetrasodium salt of ethylenediamine tetraacetic acid | 0.032 |
| $FeSO_4 \cdot 7H_2O$ | 0.05 |
| water | 10 |
| Polymerization Time, Hrs. | variable |
| Polymerization Temperature, °C | 5 |

The polymerization recipe ingredients were charged to the reactor in the order: (1) coagitated mixture, as defined above; (2) monomers; (3) oxidant; (4) activator solution. The depletion of the mercaptan was followed by periodic sampling and analysis according to the method of Kolthoff, I. M., and Harris, W. E., 2 *J. Poly. Sci.*, 49 (1947). The percentage conversion values were obtained by determining, through volatilizations, the increase in weight over the amount accounted for by the nonpolymeric solids present, e.g., emulsifier, salts, and the like.

Run 2 is a run of the invention in which a small quantity of SBR-1500 latex was charged prior to initiation of polymerization. A mixture consisting of the water, soap, and dithionite $Na_2S_2O_4$ portions of the emulsifier solution plus the modifier, t-hexadecyl mercaptan, was coagitated under nitrogen in the Waring Blendor for 40 minutes at 75° F. initial temperature to 205° F. final temperature. A small quantity of SBR-1500 latex was added to that coagitated mixture and the resulting combination was coagitated for 5 minutes in the Waring Blender within the temperature range of 75° F. initial to 150° F. final temperature. The polymerization for Run 2 was carried out under nitrogen according to the following recipe:

Recipe: SBR-1503

|  | Parts by Weight |
|---|---|
| Emulsifier Solution | |
| potassium fatty acid soap | 4.6 |
| KOH | 0.03 |
| KCl | 0.3 |
| Sodium alkylnaphthalene sulfonate | 0.2 |
| $Na_2S_2O_4$ | 0.1 |
| Tetrahydrate of the tetrasodium salt of ethylenediamine tetraacetic acid | 0.02 |

Recipe: SBR-1503-continued

|  | Parts by Weight |
|---|---|
| water | 170 |
| Modifier | |
| t-hexadecyl mercaptan | 0.352 |
| Latex | |
| SBR-1500 latex | 10[a] |
| Monomers | |
| butadiene | 70 |
| styrene | 30 |
| Oxidant | |
| p-Menthane hydroperoxide | 0.063 |
| Activator Solution | |
| Tetrahydrate of the tetrasodium salt of ethylenediamine tetraacetic acid | 0.032 |
| $FeSO_4 \cdot 7H_2O$ | 0.01 |
| $NaO_2SCH_2OH \cdot 2H_2O$ | 0.05 |
| Water | 10 |
| Polymerization Time, Hrs. | variable |
| Polymerization Temperature, °C | 5 |

[a]A 20 percent latex, i.e., 2 phm rubber is thus charged.

The polymerization recipe ingredients were charged to the reactor in the order: (1) coagitated mixture, as defined above, including the "seed" latex; (2) monomers; (3) oxidant; (4) activator solution. Periodic analyses were made as in Run 1. The data obtained for control Run 1 and Inventive Run 2 are shown below in Table I:

TABLE I

| Operation | Elapsed Time Hrs. | Residual Mercaptan wt. % | | Conversion % | |
|---|---|---|---|---|---|
|  |  | Run 1 | Run 2 | Run 1 | Run 2 |
| preemulsification | 0.0 | 96 | 100 | 0 | 0 |
|  | 0.25 | 91 | 100 | 0 | 0 |
|  | 0.4 | 98[a] | 101[a] | 0 | 0 |
| polymerization | 0.1 | 45 | 115[a] | 1.5 | 1 |
|  | 0.3 | 35 | 78.3 | 5 | 3 |
|  | 0.7 | —[b] | 50.1 | — | 8 |
|  | 1.8 | 25 | — | 27 | — |
|  | 2.7 | — | 9.3 | — | 31 |
|  | 2.8 | 22 | — | 41 | — |
|  | 3.3 | — | 9.4 | — | 38 |
|  | 3.7 | 19 | — | 51.5 | — |
|  | 5.0 | — | 4.6 | — | 57 |

[a]Anomalous, "out of order" values are believed to be attributable to experimental difficulties in sampling a heterogeneous mixture.
[b]A dash denotes "not determined".

The effectiveness of our invention, i.e., the inclusion of a small amount of preformed latex to be in the polymerization recipe is clearly seen in Table I. The important index to the smoothness of the polymerization and to the quality of the rubber is the "Residual Mercaptan, Wt. %" column. The values for Run 2 of the invention reflect an orderly depletion of mercaptan in contrast to the early, wasteful, precipitous drop exhibited by Run 1.

Our invention makes it possible to utilize the aforementioned advantages of coagitation without suffering abnormal and inefficient and partially premature depletion of the modifier.

The polymers made in accordance with the instant invention can be compounded with stabilizers, antioxidants, fillers, pigments, reinforcing agents and such other additives as may be required. These products can be employed in the fabrication of tires, belts, gaskets, shoe soles, tubing and the like.

Certainly, reasonable variations and modifications of our invention are possible yet still within the scope of our disclosure and without departing from the intended scope and spirit thereof.

We claim:

1. In a process of aqueous emulsion polymerization wherein at least one polymerizable monomer polymerizable with a redox system or free-radical initiator is polymerized under aqueous emulsion polymerization conditions in the presence of a redox or free-radical initiator, aqueous emulsifier solution, and organosulfur compound as molecular weight modifier, and aqueous medium, the steps comprising:

admixing said aqueous emulsifier solution and said organosulfur compound, coagitating said admixture of said aqueous emulsifier solution and said organosulfur compound to produce a coagitated mixture wherein the degree of said coagitation of said aqueous emulsifier solution and of said organosulfur compound is sufficient to effectuate a significant increase in the regulating index of said organosulfur compound as said modifier, admixing said coagitated admixture of aqueous emulsifier solution and organosulfur compound molecular weight modifier with said polymerizable monomer and initiator and polymerizing the resulting polymerization admixture under aqueous emulsion polymerization conditions, employing a preformed latex prepared by emulsion polymerization to the extent of about 0.1 to 10 parts by weight of polymer content of said latex per 100 parts by weight of said polymerizable monomer, wherein said preformed latex is added to said emulsifier/modifier admixture prior to coagitation thereof, subsequent to coagitation thereof, or to said emulsion polymerization system prior to, subsesquent to, or with addition of said coagitated emulsifier/modifier admixture, and prior to addition of initiator to said emulsion polymerization system, said preformed latex effective to substantially avoid early depletion of said modifier in said emulsion polymerization system.

2. The process according to claim 1 wherein said preformed polymer latex is added at least in part to said emulsifier/modifier admixture prior to coagitation thereof.

3. The process according to claim 1 wherein said preformed polymer latex is added to said emulsifier/modifier admixture subsequent to coagitation thereof.

4. The process according to claim 1 wherein said preformed polymer latex is added to said emulsion polymerization system prior to or subsequent to addition thereof of the said coagitated emulsifier/modifier admixture, and prior to addition of said initiator.

5. In a process of aqueous emulsion polymerization wherein at least one monomer polymerizable with a redox system or free radical initiator is polymerized under aqueous emulsion polymerization conditions in the presence of a redox or free radical initiator, aqueous emulsifier solution, organosulfur compound as molecular weight modifier, and aqueous medium, the steps comprising:

admixing said aqueous emulsifier solution and said organosulfur compound, coagitating said admixture of said aqueous emulsifier solution and said organosulfur compound to produce a coagitated emulsifier/modifier admixture, wherein the degree of said coagitation of said admixture of aqueous emulsifier solution and said organosulfur compound is sufficient to effectuate a significant increase in the regulating index of said organosulfur compound as said modifier, admixing said coagitated emulsifier/modifier admixture with said polymerizable monomer and initiator, and polymerizing the resulting polymerization admixture under aqueous emulsion polymerization conditions, adding a preformed latex to said admixture of said aqueous emulsifier solution and said organosulfur compound, prior to coagitation thereof, to said coagitated emulsifier/modifier admixture, or to said emulsion polymerization system prior to, subsequent to, or with addition of said coagitated emulsifier/modifier admixture, and prior to addition of initiator to said emulsion polymerization system, said preformed latex effective to substantially avoid early depletion of said modifier and said emulsion polymerization system, said preformed latex employed in an amount sufficient to provide about 0.1 to 10 parts by weight of polymer content of said latex per 100 parts by weight of said polymerizable monomer employed in said emulsion polymerization system, wherein the polymer in said preformed polymer latex is a polymer of a polymerizable conjugated diene, polymerizable monovinyl-substituted aromatic compound, or copolymer thereof, optionally with an ethylenically unsaturated nitrile, ester of acrylic or methacrylic acid, vinyl ester, or vinyl halide, wherein said organosulfur compound is a mercaptan, dialkyldixanthogen diaryldisulfide, tetraalkylthiuram monosulfide, tetraalkylthiuram disulfide, or mercaptothiazole, wherein said polymerizable monomer is a polymerizable conjugated diene, polymerizable monovinyl-substituted aromatic compound, polymerizable propenyl-substituted aromatic compound, ethylenically unsaturated nitrile, ester of acrylic acid, ester of methacrylic acid, vinyl ester, or vinyl halide, and wherein said emulsifier is a rosin acid soap, disproportionated rosin soap, fatty acid soap, alkarylsulfonate, nonionic emulsifier, or mixture.

6. The process according to claim 5 wherein said organosulfur molecular weight modifier is a hydrocarbyl mercaptan of 8 to 20 carbon atoms per molecule.

7. The process according to claim 6 wherein said hydrocarbyl mercaptan is a tertiary alkyl mercaptan.

8. The process according to claim 6 wherein said emulsion polymerization system employs sufficient said emulsifier to provide about 0.5 to 10 phm.

9. The process according to claim 8 wherein said emulsion polymerization process employs 0.01 to 5 parts of said organosulfur compound per 100 parts monomer by weight.

10. The process according to claim 8 wherein said polymerizable monomer is a conjugated diene of 4 to 12 carbon atoms per molecule and a monovinyl-substituted aromatic compound of 8 to 20 carbon atoms per molecule.

11
11. The process according to claim 10 wherein said initiator is a free-radical initiator and is a redox couple, peroxide, hydroperoxide, or azo compound.

12. The process according to claim 11 wherein said free-radical initiator is employed in the range of about 0.01 to 5 phm.

13. The process according to claim 12 wherein said emulsion polymerization process is conducted at a temperature of about −40° C. to +100° C., at a pH in the range of about 1 to 12.

14. The process according to claim 13 wherein said preformed latex is a butadiene/styrene copolymer.

15. The process according to claim 14 wherein said preformed polymer latex is SBR-1500.

16. The process according to claim 14 wherein said polymerizable monomer is represented by an SBR-1503 formulation, and wherein said organosulfur molecular weight modifier compound is t-hexadecylmercaptan.

17. The process according to claim 5 wherein said polymerizable monomer is butadiene, styrene, or both, and wherein said organosulfur molecular weight modifier compound is t-hexadecylmercaptan.

18. In a process of aqueous emulsion polymerization wherein polymerizable monomers which are a conjugated diene and a monovinyl-substituted aromatic compound polymerizable with a redox system or other free radical initiator are polymerized under aqueous emulsion polymerization conditions in the presence of a redox or other free radical initiator, aqueous emulsifier solution, organosulfur compound as molecular weight modifier, and aqueous medium, the steps comprising:

admixing said aqueous emulsifier solution and said organosulfur compound, coagitating said admixture of said aqueous emulsifier solution and said organosulfur compound to produce a coagitated emulsifier/modifier admixture, wherein the degree of said coagitation of said admixture of aqueous emulsifier solution and said organosulfur compound is sufficient to effectuate a significant increase in the regulating index of said organosulfur compound as said modifier, admixing said coagitated emulsifier/modifier admixture with said polymerizable monomers, initiator, and aqueous medium, and polymerizing said polymerizable monomers in said resulting polymerization admixture under aqueous emulsion polymerization conditions, adding a preformed latex to said admixture of said aqueous emulsifier solution and said organosulfur compound, prior to coagitation thereof, to said coagitated emulsifier/modifier admixture, or to said emulsion polymerization system prior to, subsequent to, or with addition of said coagitated emulsifier/modifier admixture, and prior to addition of initiator to said emulsion polymerization system, said preformed latex effective to substantially avoid early depletion of said modifier and said emulsion polymerization system, said preformed latex employed in an amount sufficient to provide about 0.1 to 10 parts by weight of polymer content of said latex per 100 parts by weight of said polymerizable monomer employed in said emulsion polymerization system, wherein said polymer in said preformed polymer latex is a copolymer of a conjugated diene and a monovinyl-substituted aromatic compound, 12
wherein said organosulfur compound is a mercaptan, dialkyldixanthogen, diaryldisulfide, tetraalkylthiuram monosulfide, tetraalkylthiuran disulfide, or mercaptothiazole, and wherein said emulsifier is a rosin acid soap, disproportionated rosin soap, fatty acid soap, alkarylsulfonate, nonionic emulsifier, or mixture.

19. The process according to claim 18 wherein said preformed polymer latex is added to said emulsion polymerization system by addition to the emulsifier/modifier admixture prior to coagitation thereof, or to said emulsifier/modifier admixture subsequent to coagitation thereof, or directly to said emulsion polymerization prior to or subsequent to addition of said coagitated emulsifier/modifier admixture, and prior to addition of the initiator to said emulsion polymerization.

20. The process according to claim 19 wherein said preformed polymer latex is SBR-1000, SBR-1500, SBR-1502, or SBR-1503.

21. The process according to claim 19 wherein said coagitation of said aqueous emulsifier solution and said organosulfur compound further is characterized as sufficient to provide significant reduction in particle size of said organosulfur compound in said aqueous emulsifier solution.

22. The process according to claim 18 wherein said coagitation is accomplished by tumbling, ultrasonic vibration, or high speed shearing action.

23. In a process of aqueous emulsion polymerization wherein polymerizable monomers which are butadiene and styrene are polymerized under aqueous emulsion polymerization conditions in the presence of p-menthane hydroperoxide as free radical initiator, aqueous emulsifier solution, t-hexadecylmercaptan as molecular weight modifier, and aqueous medium, the steps comprising:

admixing said aqueous emulsifier solution and said t-hexadecylmercaptan, coagitating said admixture of said aqueous emulsifier solution and said t-hexadecylmercaptan to produce a coagitated emulsifier/modifier admixture, wherein the degree of said coagitation of said admixture of aqueous emulsifier solution and said t-hexadecylmercaptan is sufficient to effectuate a significant increase in the regulating index of said t-hexadecylmercaptan as said modifier, admixing said coagitated emulsifier/modifier admixture with said polymerizable monomers, initiator, and aqueous medium, and polymerizing said polymerizable monomers in said resulting polymerization admixture under aqueous emulsion polymerization conditions, adding a preformed latex to said admixture of said aqueous emulsifier solution and said organosulfur compound, prior to coagitation thereof, to said coagitated emulsifier/modifier admixture, or to said emulsion polymerization system prior to, subsequent to, or with addition of said coagitated emulsifier/modifier admixture, and prior to addition of initiator to said emulsion polymerization system, said preformed latex effective to substantially avoid early depletion of said modifier and said emulsion polymerization system, said preformed latex employed in an amount sufficient to provide about 0.1 to 10 parts by weight of polymer content of said latex per 100 parts by weight of said polymerizable monomer employed in said emulsion polymerization system,
wherein said polymer in said preformed polymer latex is a copolymer of butadiene and styrene,
and wherein said emulsifier is a rosin acid soap, disproportionated rosin soap, fatty acid soap, alkarylsulfonate, nonionic emulsifier, or mixture.

* * * * *